United States Patent Office 2,778,333
Patented Jan. 22, 1957

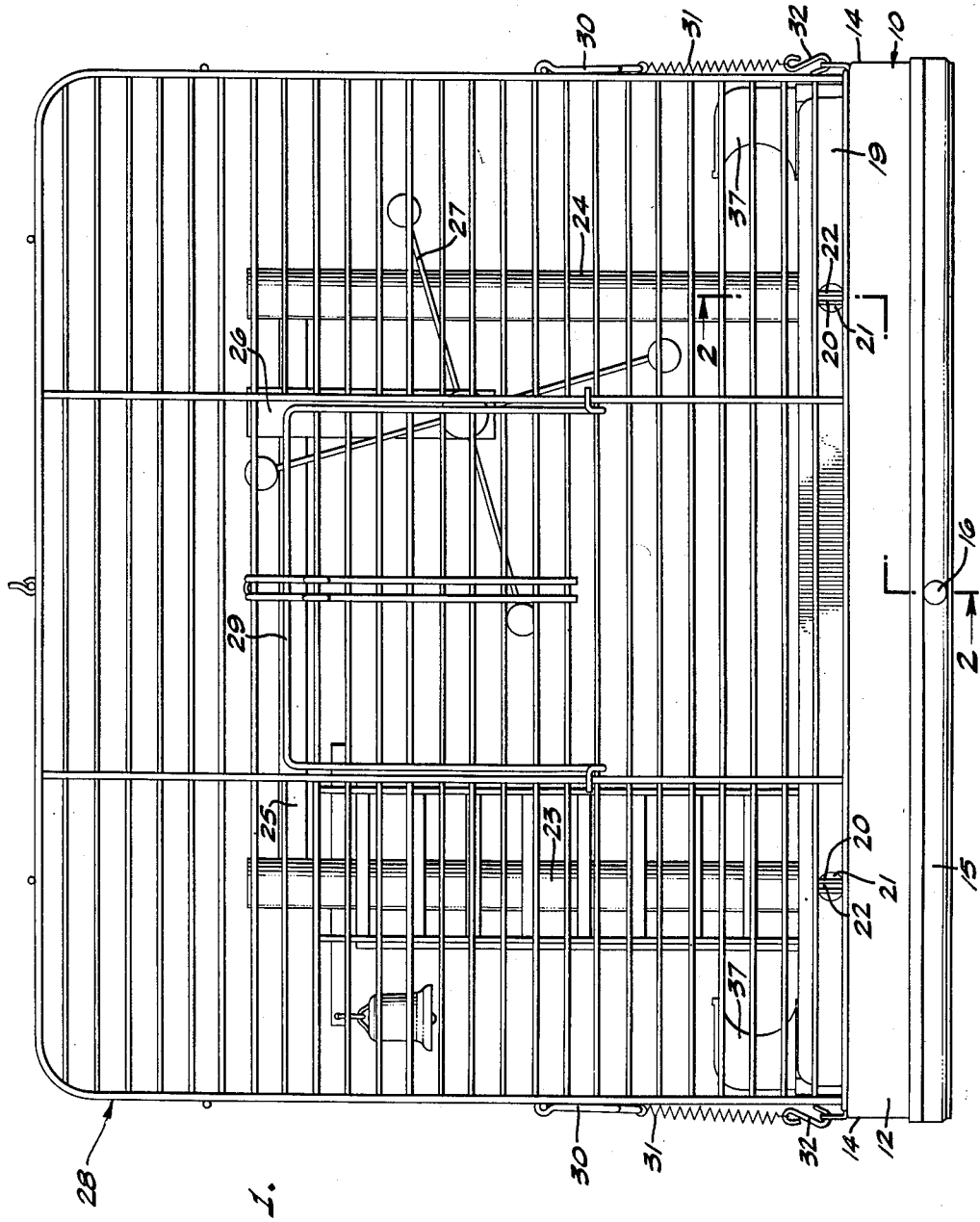

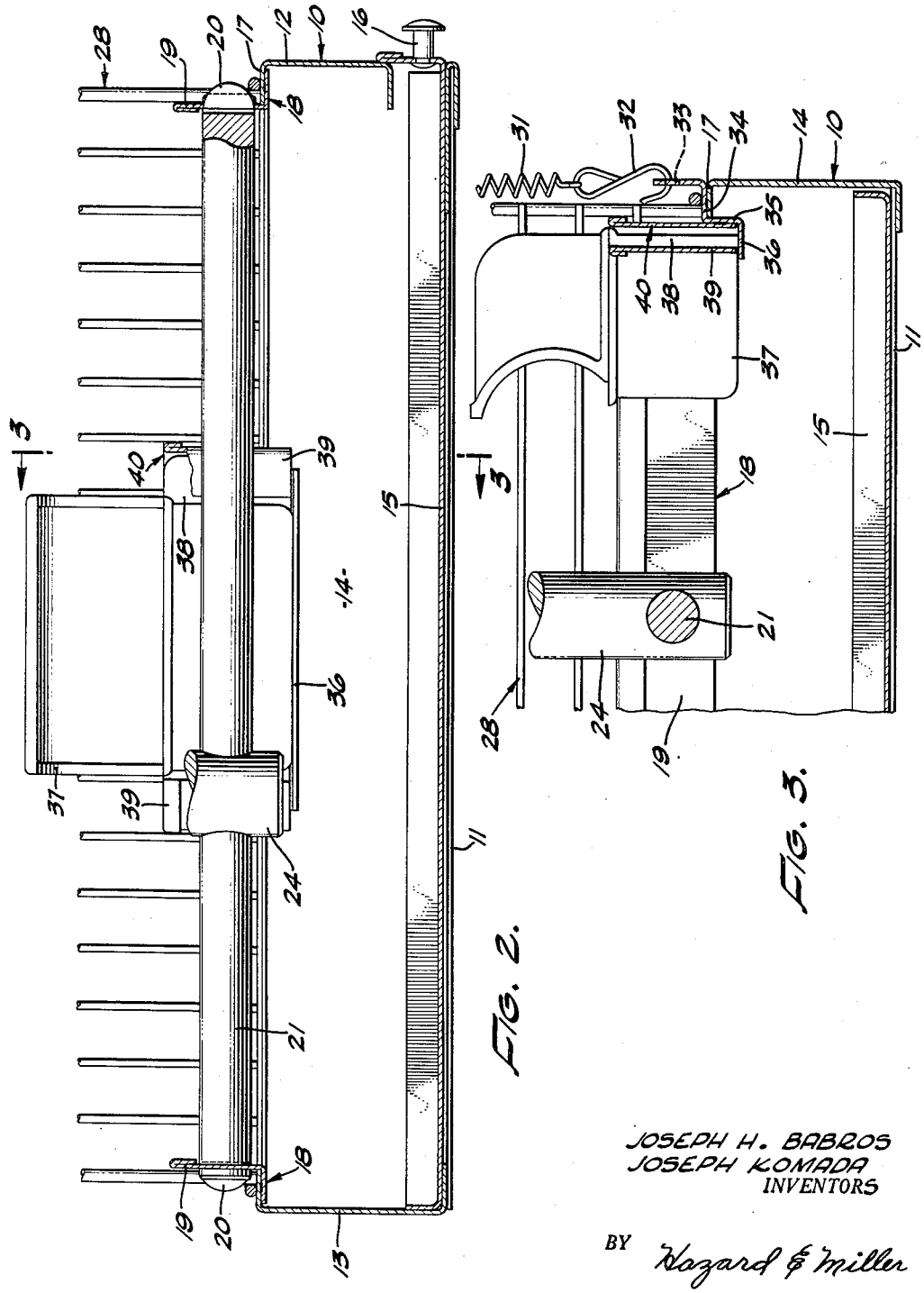

2,778,333

COMBINED CAGE AND PLAYPEN FOR BIRDS

Joseph H. Babros and Joseph Komada, Los Angeles, Calif.; said Komada assignor to said Babros Application April 15, 1955, Serial No. 501,694

1 Claim. (Cl. 119—17)

This invention relates to improvements in bird cages, and particularly to bird cages designed for use by parakeets.

Explanatory of the present invention, many persons acquiring parakeets frequently keep the parakeets caged for a period of time until the birds become adjusted to their new surroundings. Thereafter, it frequently happens that the birds are periodically released for flight about a closed room. Frequently, these birds become sufficiently adjusted and sufficiently tame that so-called play pens are provided therefor consisting merely of a tray on which various types of perches and other supporting apparatus in the nature of miniature trapeze articles are mounted. These birds will voluntarily approach and perch on these open perches or similar supports when left for released flight about the room.

An object of the present invention is to provide what may be regarded as a combined cage and play pen in that the cage consists of a base frame on which the various perches or trapeze apparatus is mounted, and which has an open-bottomed wire cage detachably connected thereto. In this manner the bird may be caged and confined in the cage when desired or the cage may be detached from the base frame and removed therefrom, leaving the perches and trapeze apparatus mounted on the base frame so that it may function as a play pen.

More specifically, an object of the invention is to provide a cage wherein the base frame has a tray slidably and removably mounted thereon so that the tray may be removed for cleaning purposes without opening the cage with attendant danger of releasing the bird. This tray is removable for this purpose regardless of whether the cage is in applied position on the base frame or the cage has been removed therefrom, converting the cage into a play pen. In either position the perches and trapeze apparatus may remain in applied position on the base frame and the tray can at all times be removed without disturbing the perches or trapeze apparatus whenever it is desired to clean the same.

Another object of the invention is to provide a novel means for mounting water and food cups within the cage so that these may remain in applied position regardless of whether the wire cage is removed from the base frame or not.

With the foregoing and other objects in view, which will be made manifest in the following detailed description and specifically pointed out in the appended claims, reference is had to the accompanying drawings for an illustrative embodiment of the invention, wherein:

Figure 1 is a view in front elevation of a bird cage embodying the present invention;

Fig. 2 is an enlarged sectional view taken substantially upon the line 2—2 upon Fig. 1; and Fig. 3 is an enlarged sectional view, taken substantially upon the line 3—3 upon Fig. 2.

Referring to the accompanying drawings wherein similar reference characters designate similar parts throughout, the improved bird cage comprises a base frame generally indicated at 10. This base frame is preferably formed of sheet metal and has a bottom 11, an upstanding front wall 12, a rear wall 13, and side walls 14.

In the front wall 12 adjacent the bottom thereof there is an opening extending from side wall to side wall through which a tray 15 is slidable, the front wall of the tray being equipped with a suitable handle 16 by which it may be entirely withdrawn from the front of the base frame for cleaning purposes. The top portions of the front, rear, and side walls are bent inwardly as indicated at 17, and the inwardly bent portions of the front and rear walls have angular sheet metal sections 18 spot welded or otherwise secured thereto so as to provide yieldable upstanding portions 19. These upstanding portions have adjacent lips 20 struck out from the bodies thereof, and these lips are bent into parallel relationship to extend outwardly from the base frame. Wooden cross bars or perches 21 extend across the base frame from one angular member 18 to the other. The ends of these cross bars or perches have diametrical slots formed therein adapted to receive the lips 20 and the narrow connecting web 22 disposed therebetween. By positioning the diametrical slot of the cross bar or perch 21 over the web 22 and along the sides of the lips 20 on the front angular member 18 and springing the upstanding portion 19 on the rear wall 13 outwardly, the rear end of each of the cross bars or perches may be positioned on the base frame. On release of the upstanding portion 19 on the rear wall 13 this portion will resiliently return to its normal position, thus holding the two cross bars or perches on the base frame. These cross bars can be removed from the base frame in the converse manner, that is, by springing the resilient portion 19 outwardly until one end of each of the cross bars can be removed therefrom.

These cross bars serve to support various other pieces of apparatus, such as for example vertical posts 23 and 24 which are connected together by an upper bar or perch 25. On this upper bar there may be a vertical suspending member 26 on which is rotatably mounted a miniature Ferris wheel indicated at 27. Various other items of support may also be supported by the cross bars 21 and the posts 23 and 24. The nature or the quantity of such apparatus is immaterial insofar as the present invention is concerned as long as it is supported on the cross bars 21 on the frame 10 above the tray 15.

An open-bottomed wire cage 28 is provided which may have in the front wall thereof a door 29 embodying the invention disclosed in our prior United States Letters Patent No. 2,693,786, issued November 9, 1954. This cage is detachably and releasably supported on the inwardly bent portion 17 of the walls of the base frame. As a means for detachably connecting the cage to the base frame, the cage is provided with hangers 30 and tension springs 31 which are equipped with hooks 32 engageable with sheet metal eyes 33 that are mounted on the side walls of the base frame, such as by spot welding. These eyes have bases 34 that are spot welded or otherwise secured to the inwardly bent portions 17 on the side walls 14. They extend downwardly therefrom as indicated at 35 and provide horizontally extending flanges 36. These flanges function as stops limiting downward movements of food and water cups 37. These food and water cups are provided at their ends with laterally extending flanges 38 which are vertically guided within reversely bent portions 39 of sheet metal members 40 that are spot welded or otherwise secured to the downwardly extending portions 35. When the cups are in applied position the fit between the flanges 38 and the reversely bent portions 39 holds the cups against tilting. Downward sliding movement of the cups is limited by the flanges 36. However, when it is desired to remove the cups for either refilling or cleaning purposes the flanges 38 are merely caused to slide with the cups up through the reversely bent portions 39.

When the parakeet is first acquired it may be kept confined within the cage. However, if it is desired to merely release the bird from the cage the door 29 may be opened and swung into horizontal position. As the bird becomes adjusted to its new surroundings it may be desired to entirely remove the cage 28. This is accomplished by merely detaching the hooks 32 from their respective eyes 33. The wire cage may then be lifted entirely from the base frame. This leaves all of the apparatus supported on the cross bars 21 supported on the base frame, and the cage is thus converted to a type of play pen. Whether the cage is in applied position or is removed therefrom, the supporting apparatus within the cage is in no way disturbed. Furthermore, as the supporting apparatus is supported on the base frame above the tray 15 the tray can at all times be removed for cleaning purposes regardless of whether the cage is in applied position or not and removal of the tray in no way disturbs the supporting apparatus that is supported on the base frame.

It will be appreciated from the above described construction that the improved bird cage is quite versatile in its use in that it may be used as a conventional bird cage wherein the bird is kept confined at all times. It is possible to leave the cage in applied position and to merely open the door for the purpose of releasing the bird or in the alternative, the entire cage may be removed from the base frame, converting the structure into a play pen. Removal of the cage in no way disturbs the supporting apparatus and in either "cage on" or "cage off" position the removal of the tray 15 for cleaning purposes is readily possible at all times.

Various changes may be made in the details of construction without departing from the spirit and scope of the invention as defined by the appended claim.

We claim:

A bird cage comprising a base frame having a bottom, front, rear, and side walls, the upper portions of the side walls extending inwardly to provide a seat for the bottom of a wire cage, a tray slidable through the front wall on the bottom of the base frame, supporting structure mounted on the base frame above the tray so as not to be disturbed upon removal of the tray, and an open-bottomed wire cage seated upon the seat at the tops of the walls of the base frame, hooks resiliently mounted on the cage and means on the base frame engaged by the hooks for releasably attaching the cage to the base frame whereby upon disengagement of the hooks from said means the cage may be detached from the base frame and removed without disturbing the supporting structure on the base frame.

References Cited in the file of this patent

UNITED STATES PATENTS

| 1,879,332 | Kulp | Sept. 27, 1932 |
| 1,896,097 | Palmer | Feb. 7, 1933 |
| 2,190,119 | Hoefler | Feb. 13, 1940 |
| 2,708,900 | Yellin | May 24, 1955 |
| 2,718,875 | Schaubel | Sept. 27, 1955 |
| 2,725,851 | Futterer | Dec. 6, 1955 |

FOREIGN PATENTS

| 621,319 | Germany | Nov. 5, 1935 |